United States Patent

Hiratsuka et al.

[11] Patent Number: 5,119,184
[45] Date of Patent: Jun. 2, 1992

[54] COLOR IMAGE PROCESSING APPARATUS WITH DIGITAL COLOR SIGNAL COMPRESSION MEANS

[75] Inventors: Seiichiro Hiratsuka; Koji Washio, both of Hachioji; Masahiko Matsunawa, Ome, all of Japan

[73] Assignee: Konica Corporation, Tokyo, Japan

[21] Appl. No.: 498,905

[22] Filed: Mar. 26, 1990

[30] Foreign Application Priority Data

Mar. 28, 1989 [JP] Japan ................................ 1-76328

[51] Int. Cl.$^5$ ............................................. H04N 1/46
[52] U.S. Cl. ........................................ 358/75; 358/80; 382/47
[58] Field of Search ................. 358/75, 80, 133, 13, 358/22; 382/47; 340/731

[56] References Cited

U.S. PATENT DOCUMENTS 4,500,919  2/1985  Schreiber ............................ 358/80
4,791,476 12/1988  Chauvel ............................. 358/80
4,887,151 12/1989  Wataya .............................. 358/75

Primary Examiner—Leo H. Boudreau
Attorney, Agent, or Firm—Finnegan, Henderson, Farabow, Garrett, and Dunner

[57] ABSTRACT

The invention provides a color image-processing apparatus in which there is provided a color reproduction table for producing plural color image signals for each of a plurality of processing channels in response to digital pixel signals splitted into said plurality of processing channels. There is further provided a signal processor for modifying a bit configuration of the digital pixel signals so that the bit configuration is differently modified corresponding to each of said plurality of processing channels. The produced plural color image signals are composed into one channel to form a new color image.

12 Claims, 5 Drawing Sheets

COLOR IMAGE PROCESSING APPARATUS WITH DIGITAL COLOR SIGNAL COMPRESSION MEANS

BACKGROUND OF THE INVENTION

This invention relates to a color image processing apparatus and more particularly to a color image processing apparatus by which excellent color image reproduction can be conducted.

Conventionally, a color image processing apparatus has been used in which a color image is recorded on a recording paper in such a manner that; a color image on a photograph or a text is optically read out by separating it into red R, green G, and blue B; these colors are converted into recording colors such as yellow Y, cyan C, black K, and the like; and the color image is recorded on a recording paper by an image processing apparatus such as an electrophotographic color copier according to the converted colors.

FIG. 4 is a schematic illustration of this type of color image processing apparatus. In FIG. 4, the numeral 1 is a scanner unit which reads out an original image optically and outputs the readout data in the form of digital data of R, G, and B. The numeral 2 is a color reproduction part in which the readout data of R, G, and B is converted into the data of the toner colors of Y, M, C, and K. In the color reproduction part 2, color correction (R, G, B→Y, M, C) and under-color-removal (Y, M, C→Y, M, C, K) are simultaneously conducted according to a lookup-table in order to make 6-bit data of Y, M, C, and K. The numeral 3 is a color balance adjustment part in which the density of colors represented by Y, M, C, and K is adjusted in order to adjust color balance. The numeral 4 is a printer unit by which an image is formed according to the adjusted color data of Y, C, and K. The toner images formed according to the density data of Y, M, C, and K are superimposed on the surface of the photoreceptor drum and finally transferred onto a transfer paper to form a color image.

When a color image is reproduced by the above-described process, a large memory capacity is needed for the color reproduction part 2.

For example, the 6-bit data of R, G, and B is converted into the 6-bit data of Y, M, C, and K by the color reproduction part 2. FIG. 5 is a schematic illustration which shows the composition of the color reproduction part 2. In FIG. 5, the numeral 2a is an even number channel color reproduction table in which the 6-bit data of even numbers (the even number channel) of R, G, and B is converted into the 6-bit density data of Y, M, C, and K. The numeral 2b is an odd number channel color reproduction table in which the 6-bit data of odd numbers (the odd number channel) of R, G, and K. The two tables are substantially the same. The numeral 2c is a channel composition circuit in which the output of the even number channel color reproduction table 2a and that of the odd number channel color reproduction table 2b are composed. The even number channel color reproduction table and the odd number channel reproduction table are composed of ROM into which the 6-bit data of R, G, and B is inputted as the address input and from which the 6-bit data of Y, M, C, and K stored in the memory is outputted. The reason why the channel is divided into the even number channel and the odd number channel is to process the data at a high rate of speed taking the access time into consideration. To go into more details, color reproduction processing is conducted by both the odd number channel color reproduction table and the even number channel color reproduction table in such a manner that; the first pixel data of R, G, and B input data is processed in the odd number channel color reproduction table 2b; the second pixel data is processed in the even number channel color reproduction table 2a; the third pixel data is processed in the odd number channel color reproduction table 2b; and so on. After the color data is processed in the two tables, the processed data is composed in the channel composition circuit 2c. According ly, even if the memory access time is a little longer, it causes no problem. Since image formation at the printer unit 4 is conducted four times in order of Y, M, C, and K, color reproduction is also conducted four times in accordance with image formation.

As color data processing is conducted in the manner described above, too much memory capacity is required of the color reproduction table of ROM composition, which will be explained as follows. Because each of R, G, and B needs a memory capacity of 6 bits to be stored, the memory capacity needed for the color reproduction table is address 18 (6×3) bits. When each of Y, M, C, and K data is stored in 1 byte, the necessary capacity of the memory amounts to $2^{18} \times 4 = 1$ M bits (each pixel channel).

The disadvantage of this color image processing apparatus is that excessive memory capacity is required. Since the same processing is conducted in each pixel channel, the advantage of dividing the color data into pixel channels is little.

SUMMARY OF THE INVENTION

The present invention is accomplished in order to solve the problems described above. It is an object of the invention to provide a color image processing apparatus which can precisely reproduce colors with a color reproduction table with a small memory capacity.

The present invention to solve the above-described problems is as follows. In a color image processing apparatus equipped with a color reproducing means for processing a digital signal of each color according to a color reproduction table with regard to a plurality of pixel channels, for composing the plurality of pixel channels, and for outputting the signal as a digital recording color signal, the improvement comprises a compression means by which the digital color signals of a plurality of pixel channels are compressed in a different way.

In the color image processing apparatus of the present invenvion, the number of bits of the digital color signal is compressed at each pixel channel. Accordingly, the scale of the color reproducing means can be reduced.

DETAILED DESCRIPTION OF THE INVENTION

Figure 1:
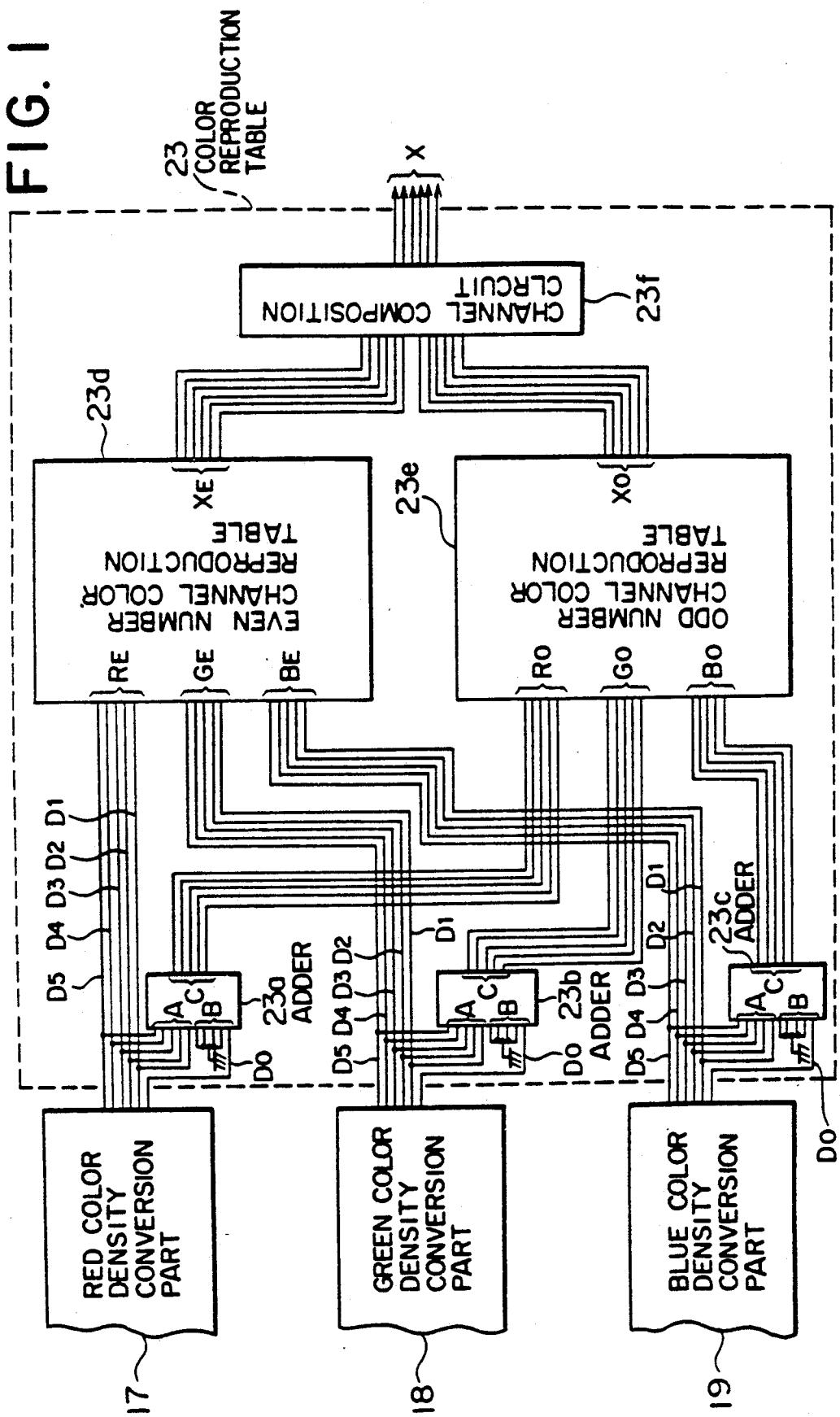
FIG. 1 is a schematic illustration which shows an example of the present invention.

Referring to the drawings, an example of the present invention will be explained in detail.

Figure 2:
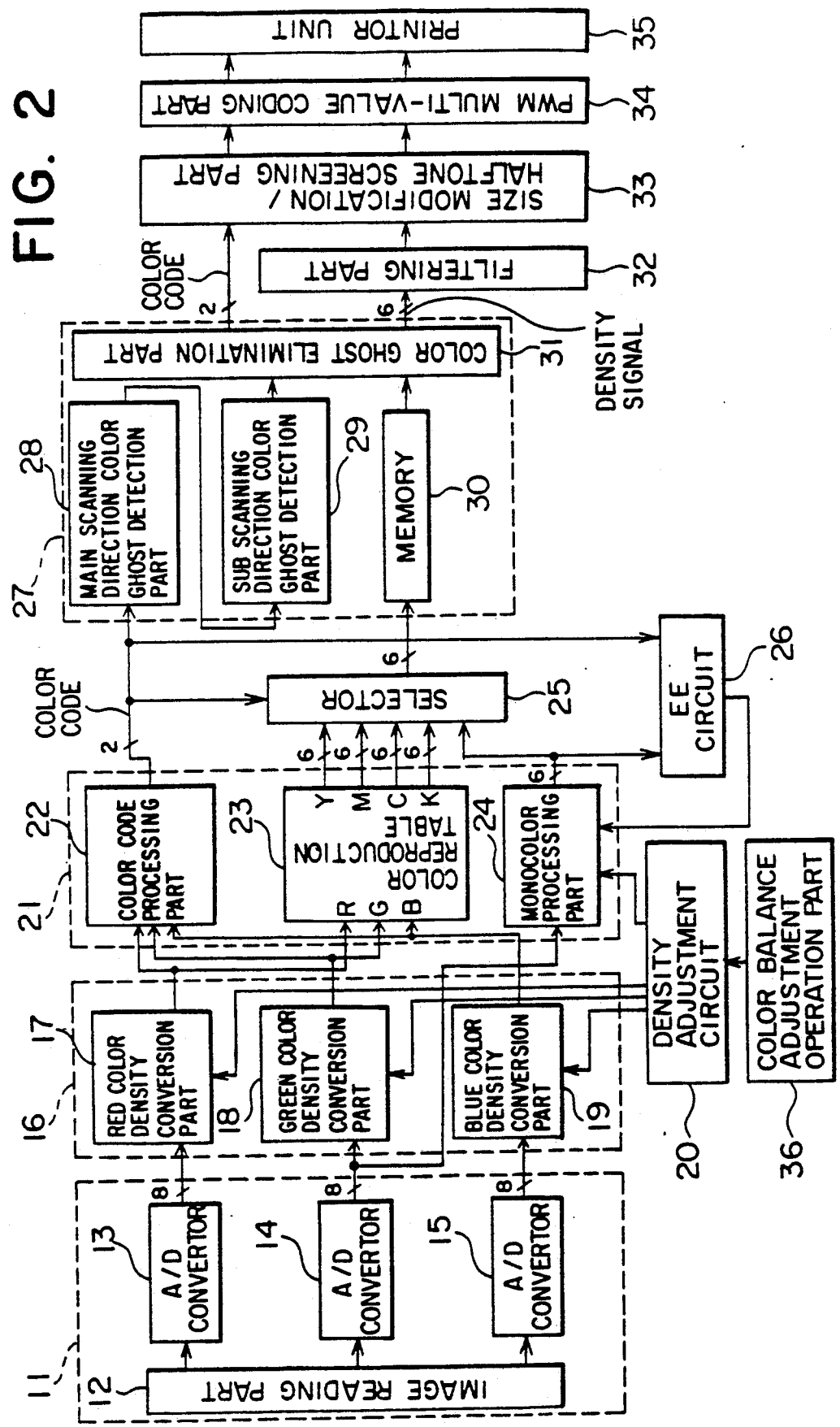
FIG. 2 is a schematic illustration which shows the composition of the main portions of the example of the present invention.

Referring first to FIG. 2, the composition of an example of the present invention will be described as follows.

In FIG. 2, the numeral 11 is a scanner unit which has an image reading part and an A/D converter in order to optically read a document image and output the signals of the image, wherein the signals take the form of 8-bit digital data of R, G, and B. The numeral 12 is an image reading part which optically reads a document image. The numeral 13 is an A/D converter which converts a red image signal read by the image reading part 12 into 8-bit digital data. The numeral 14 is an A/D converter which converts a green image signal read by the image reading part 12 into 8-bit digital data. The numeral 15 is an A/D converter which converts a blue signal read by the image reading part 12 into 8-bit digital data. The numeral 16 is a density conversion part which converts the 8-bit digital data of R, G, and B sent from the scanner unit 11 into 6-bit data. The numeral 17 is a red color density conversion part which converts 8-bit digital data of red into 6-bit digital data, wherein density is adjusted during the data conversion. The numeral 18 is a green color density conversion part which converts 8-bit digital data of green into 6-bit digital data, wherein density is adjusted during the data conversion. The numeral 19 is a blue color density conversion part which converts 8-bit digital data of blue into 6-bit digital data. The numeral 20 is a density adjustment circuit which adjusts color balance. This density adjustment circuit 20 adjusts the balance of each color. The numeral 21 is a color reproduction part which processes color codes, reproduces color data, and processes monocolor data. The numeral 22 is a color code processing part which receives data from the density conversion parts of R, G, and B, discriminates among white, black, and chromatic colors, and outputs color codes. The numeral 23 is a color reproduction table which receives R, G, and B data from the color density conversion parts of R, G, and B, and generates the data of Y, M, C, and K. The numeral 24 is a monocolor processing part which receives data from the density adjustment circuit 20 and processes monocolor data, wherein a monocolor is defined as an achromatic color such as black. The numeral 25 is a selector which selects one out of Y, M, C, K, and monocolor data according to the color codes. The numeral 26 is an EE circuit which automatically adjusts density (EE). The numeral 27 is a color ghost correction part which corrects color ghosting. The numeral 28 is a main scanning direction color ghost detection part which detects color ghosting of the main scanning direction. The numeral 29 is a sub-scanning direction color ghost detection part which detects color ghosting of the sub-scanning direction. The numeral 30 is a memory in which the data of a plurality of pixels is temporarily stored. The numeral 31 is a color ghost elimination part which eliminates detected color ghosting. The numeral 32 is a filtering part which filters density signals. The numeral 33 is a size modification/halftone screening part which conducts size modification and halftone screening. The numeral 34 is a PMW multi-value coding part which turns 6-bit density signals into multi-values by pulse width modulation (PWM). The numeral 35 is a printer unit which forms color images by superimposing Y, M, C, and K toner images in order. The numeral 36 is a color balance adjustment operation part which conducts the color balance adjustment operation.

A document image is read out at the image reading part 12, and the image data obtained is changed into analog signals of R, G, and B. The analog signals are converted into 8-bit digital data by A/D converters at each pixel. The digital data of R, G, and B is supplied to the density conversion part 16. At the density conversion part 16, 8-bit data is converted into 6-bit data while color balance is adjusted by the density adjustment circuit 20 at each color. To go into more detail, at each color density conversion part, the output levels of R, G, and B are adjusted according to the direction of the density adjustment circuit 20, wherein the direction is based on the operation of the color balance adjustment operation part 36. The output data of the color density conversion parts of R, G, and B is impressed on the color code processing part 22 and the color reproduction table 23. From the color code processing part, color codes are outputted that indicate to which color region of white, black, and chromatic colors each pixel belongs according to the data levels of R, G, and B.

The color reproduction table 23 conducts color correction (R, G, B→Y, M, C) and under-color-removal (Y, M, C→Y, M, C, K) simultaneously according to the lookup-table in order to make 6-bit data of Y, M, C, and K. The monocolor processing part 24 makes 6-bit monocolor (achromatic color) data from the output data of the A/D converter 14. In the selector 25, the data of Y, M, C, K, or a monocolor is selected and outputted one by one according to the above-described color codes and the scanning codes relating to the rotation of the photoreceptor drum of the printer unit 35. Then, elimination of color ghosting, size modification, halftone processing, and multi-value making are conducted. After that, the image is formed by the printer unit 35. In the printer unit 35, the toner images of Y, M, C, and K are superimposed on the photoreceptor drum in order and the images are transferred onto a recording paper.

Referring to FIG. 1, the principal portions of an example of the invention will be described.

FIG. 1 is a schematic illustration which shows the principal portions of an example of the color reproduction part of the color image processing apparatus of the invention. The numeral 23 is a color reproduction part which generates the data of Y, M, C, and K after receiving the data of R, G, and B from the density conversion parts of R, G, and B. The numeral 23a is an adder which receives 6-bit data ($D_5$ to $D_0$) of R and adds input A ($D_5$ to $D_1$) of the high-ranking 5-bit data to input B ($D_0$) of the lowest-ranking bit data in order to generate output C ($D_5$, $D_4$, $D_3$, $D_2$, $D_1+D_0$). The numeral 23b is an adder which receives 6-bit data ($D_5$ to $D_0$) of G and adds input A ($D_5$ to $D_1$) to input B ($D_0$) in order to generate output C ($D_5$, $D_4$, $D_3$, $D_2$, $D_1+D_0$). The numeral 23c is an adder which receives 6-bit data ($D_5$ to $D_0$) of B and adds input A ($D_5$ to $D_1$) to input B ($D_0$) in order to generate output C ($D_5$, $D_4$, $D_3$, $D_2$, $D_1+D_0$). The numeral 23d is an even number channel color reproduction table which receives the data of the even number (the even number channel) of the high-ranking 5-bit data of R, G, and B, and which converts the data into 6-bit density data of Y, M, C, and K. The numeral 23e is an odd number channel reproduction table which receives the 5-bit data of the odd number (the odd number channel) and converts the data into the 6-bit density data of Y, M, C, and K. The numeral 23f is a channel composition circuit which receives the output $X_E$ of the even number channel color reproduction table 23d and the output $X_O$ of the odd number channel color reproduction table 23e, and which composes the channels. The data inputted into the even number channel reproduction table and the data inputted into the odd number channel reproduction table differ, which is different from the conventional method.

In the circuit described above, the color reproduction of the even number channel data is conducted by the even number channel color reproduction table 23d, and the color reproduction of the odd number channel data is conducted by the odd number channel color reproduction table 23e. After the color reproduction, the signals of recorded colors in which the color channels have been composed are outputted from the channel composition circuit 23f.

In the circuit explained above, the 6-bit data of R is described as follows, $$R = R_5\, 2^5 + R_4\, 2^4 + R_3\, 2^3 + R_2\, 2^2 + R_1\, 2^1 + R_0\, 2^0$$

$R_E$, which is the input of the even number channel color reproduction table 23d, becomes -5-bit data which can be described as follows.

$$R_E = R_5\, 2^5 + R_4\, 2^4 + R_3\, 2^3 + R_2\, 2^2 + R_1\, 2^1$$

$R_O$, which is the input of the odd number channel color reproduction table 23e, becomes 5-bit data which can be described as follows.

$$R_O = R_5\, 2^5 + R_4\, 2^4 + R_3\, 2^3 + R_2\, 2^2 + (R_1 + R_0)\, 2^1$$

R, $R_E$, and $R_O$ have relations with one another which can be expressed as follows.

$$R = (R_E + R_O)/2$$

Consequently, the 6-bit data can be replaced by the 5-bit odd number channel data and the 5-bit even number channel data. The data processing of G and B can be conducted in the same way as described above. The data of G and B can be made 5-bit data. As a result, the address of the color reproduction table 23d and 23e can be made 15 (5×3) bits, so that the memory capacity can be reduced.

To go into more detail, the memory capacity of 4 colors, Y, M, C, and K, of the even number channel color reproduction table 23d and the odd number channel color reproduction table 23e, is $2^{15} \times 4 = 128\ k$ bytes (at each channel). Therefore, by decreasing the address by 3 bits, the memory capacity becomes $2^{-3} = \frac{1}{8}$. Since the color of a pixel of an image is usually not so different from that of the next pixel, there is no problem at all even if the information of two pixels which are next to each other is divided into the even number channel and the odd number channel in order to be processed.

In the example mentioned-above, the input of the even number channel color reproduction table 23d and the odd number channel color reproduction table 23e is respectively defined as 15 bits (R; 5 bits, G ; 5 bits, B ; 5 bits). It can be understood that the invention is not limited by the above-described example.

For instance, it is possible to make the input of the even number channel color reproduction table 23d 13 bits ($R_E$; 4 bits, $G_E$; 5 bits, $B_E$; 4 bits). It is also possible to make the input of the odd number channel color reproduction table 23e 14 bits ($R_O$, 5 bits, $G_O$, 4 bits, $B_O$, 5 bits). In other words, the input $R_E$ of the even number channel color reproduction table 23d is made 4-bit data which is expressed as follows.

$$R_E = R_5\, 2^5 + R_4\, 2^4 + R_3\, 2^3 + (R_2 R_1)\, 2^2$$

$R_O$, which is the input of the odd number channel color reproduction table 23e becomes 5-bit data expressed as follows.

$$R_O = R_5\, 2^5 + R_4\, 2^4 + R_3\, 2^3 + R_2\, 2^2 + R_0\, 2^1$$

R, $R_E$, and $R_O$ have relations with one another as follows.

$$R = (R_E + R_O)/2$$

The 6-bit data can be replaced by the 5-bit data of the odd number channel and the 4-bit data of the even number channel. The data of G and B can be processed in the same way as R.

As a result, the memory capacity of the 4 colors, Y, M, C, and K, is 32 k bytes in the case of the even number channel color reproduction table 23d and is 64 k bytes in the case of the odd number channel color reproduction table 23e. Accordingly, since the address is further reduced compared with the above-described example, the memory capacity becomes 1/20 of the conventional example. Since the color of a pixel is usually not so different from that of the next pixel, there is no problem at all even if the information of two pixels which are next to each other is divided into the even number channel and the odd number channel in order to be processed.

In the two examples mentioned above, data processing is conducted by two channels, one is the even number channel and the other is the odd number channel. However, it can be understood that the present invention is not limited to the specific examples. In other words, it is possible to make the color reproduction circuit in such a manner that the data processing circuit is divided into 3 channels or 4 channels.

Figure 3:
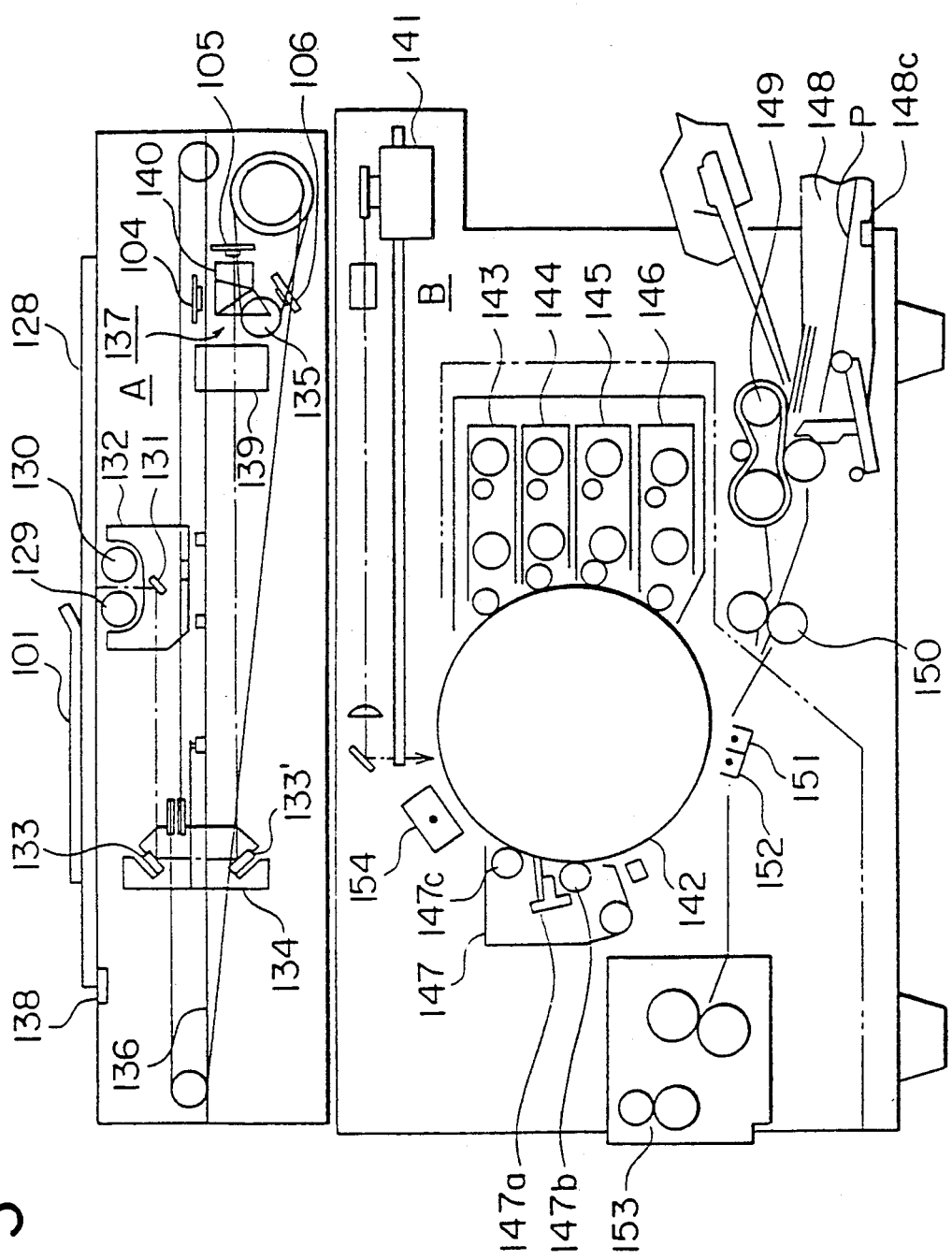
FIG. 3 is a schematic illustration which shows the structure of a color copier.
Figure 4:
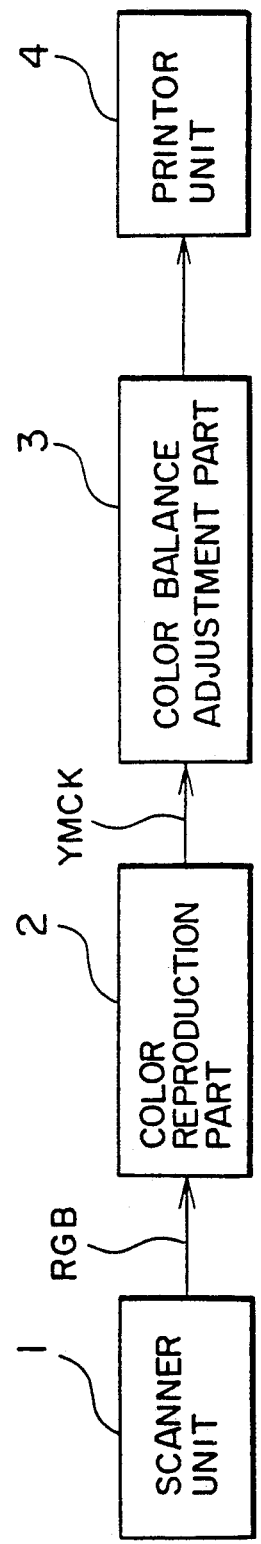
FIG. 4 is a schematic illustration which shows the composition of a conventional color image processing apparatus.
Figure 5:
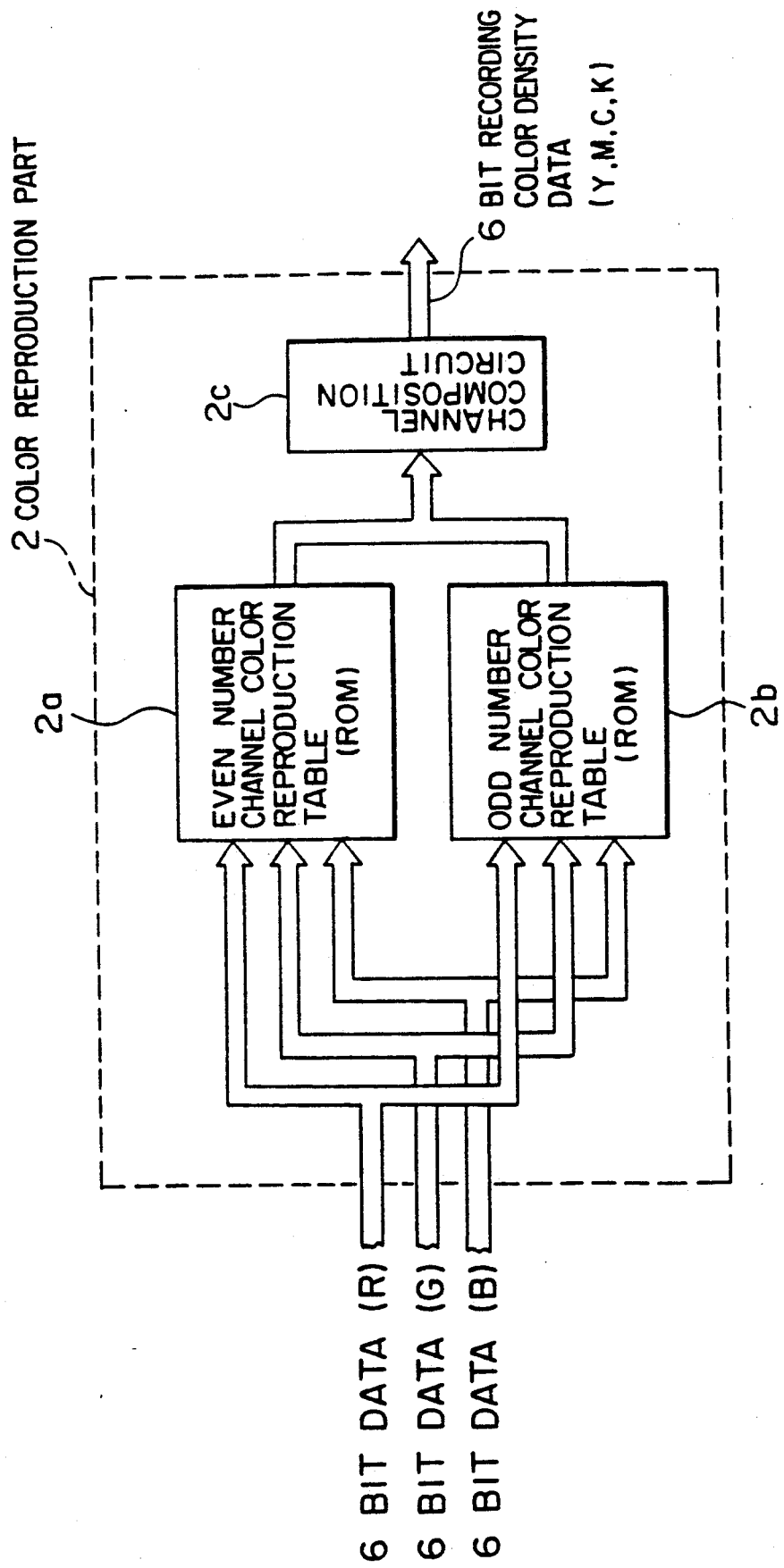
FIG. 5 is a schematic illustration which shows the composition of the color reproduction unit of the conventional color image processing apparatus.

Referring to FIG. 3, the structure and motion of a color copier to which the image processing apparatus of the present invention can be applied, will be explained as follows. The dry color development system is adopted in the color copier. The two component non-contact reversal development system is adopted in this example. In other words, the conventional transfer drum is not used in the example, but the images are superimposed on the photoreceptor drum which is used to form an image in the electrostatic copier. In this example, in order to accomplish the object of making the apparatus compact, a four-color image of yellow, magenta, cyan, and black is developed while the photoreceptor drum is rotated 4 full turns, and after development the image is transferred to a plain recording paper by rotating the drum one full turn.

When the copy button of the color copier is pressed, the image reading unit A is driven, and the document 101 on the platen glass 128 is optically scanned by the optical system.

This optical system is composed of the carriage 132 on which the light sources 129, 130 of the halogen lamps and the reflection mirror 131 are mounted and of the movable mirror unit 134 on which V mirrors 133, 133' are mounted.

The carriage 132 and the movable unit 134 are moved by the stepping motor 135 on the slide rail 136.

The optical information (the image information) obtained by illuminating the document 101 with the light sources 129, 130, is sent to the optical information conversion unit 137 through the reflection mirror 131 and the mirrors 133, 133'.

As illustrated in FIG. 3, the standard white plate 138 is provided to the left rear side of the platen glass 128. The document reading unit A can be normalized by the white signal obtained by optical scanning of the standard white plate 138.

The optical information conversion unit 137 is composed of the lens 139, the prism 140, the two dichroic mirrors 102, 103, CCD 104 by which a color separation image of red can be taken, CCD 105 by which a color separation image of green can be taken, and CCD 106 by which a color separation image of blue can be taken.

The optical signal obtained by the optical system is converged by the lens 139 and separated into blue optical information and yellow optical information by the dichroic mirror 102 provided in the prism 140. Furthermore, the yellow optical information is separated into red optical information and green optical information by the dichroic mirror 103. In the way described above, the optical color image is resolved by the prism 140 into the optical color information of red R, green G, and blue B.

Each color separation image is formed on the light receiving surface of each CCD. The image signal converted into the electrical signal is obtained in this way. After the image signal has been processed in the signal processing system, each color signal is outputted to the image writing unit B.

The signal processing system includes various kinds of signal processing circuits such as the A/D converters, the color reproduction tables, the color ghost elimination part, and the PMW multi-value coding part as shown in FIG. 2.

Image writing unit B has the polariscope 141. The polariscope composed of the polarizer in which the galvanomirror, the rotary polygon mirror, and crystal are used, can be used as the polariscope 141. Polarization scanning is conducted by the polariscope 141 with the laser beam which is modulated by the color signal.

When the polarization scanning is started, the beam is detected by the laser beam index sensor (not illustrated in the drawing), beam modulation by the first color signal (the yellow signal, for instance) is started. The modulated beam scans the surface of the photoreceptor 142 which is uniformly charged by the electrical charger 154.

The electrostatic latent image corresponding to the first color signal is formed on the photoreceptor 142 by the main scanning conducted by the laser beam and by the sub-scanning conducted by the rotation of the photoreceptor 142.

This electrostatic latent image is developed by the developing unit 143 in which yellow toner is contained and the yellow toner image is formed on the photoreceptor. The predetermined developing bias voltage is impressed on the developing unit 143 by a high voltage power source.

When toner supply is necessary, toner is supplied to the developer 143 by the toner supply means (not shown in the drawing) controlled by the direction signal sent from CPU (not shown in the drawing) which controls the system. When the cleaning blade 147a does not come into contact with the photoreceptor surface, the above-described toner image on the photoreceptor is rotated. The electrostatic latent image of the second color signal (for instance, the magenta signal) is formed in the same way as the first color signal. The second electrostatic latent image is developed to the magenta toner image by the developing unit 144.

A predetermined developing bias voltage is impressed on the developing unit 144 by a high voltage power source.

The electrostatic latent image is formed according to the third color signal (the cyan signal) in the same way. The latent image is developed to a cyan toner image by the developing unit 145 in which the cyan toner is contained. The electrostatic latent image is formed by the fourth color signal (the black signal) and developed by the developing unit 146 in which the black toner is contained. The fourth latent image is developed in the same way as described above.

Consequently, a multicolor toner image is formed on the surface of the photoreceptor 142 as several color images are superimposed.

Four color toner image formation has been explained above. Of course, a single color toner image or a two color toner image can be formed in the same way.

As for the developing process, an example of the two component noncontact developing process has been explained above, wherein in the two component noncontact developing process, A.C. or D.C. current bias voltage is impressed on the developing units and each toner is transferred to the photoreceptor 142.

Recording paper P which is delivered from the paper feeding unit 148 through the feeding roller 149 and the timing roller 150, is conveyed to the surface of the photoreceptor 142 in synchronization with the rotation of the photoreceptor 142. Then, the multicolor toner image is transferred onto recording paper P by the transfer electrode 151 on which high voltage is impressed by a high voltage power source. After the image has been transferred, recording paper P is separated from the photoreceptor by the separation electrode 152. After recording paper P has been separated from the photoreceptor, it is conveyed to the fixing unit 153 to be fixed and a fixed color image is obtained.

After the color image has been transferred to recording paper P, the photoreceptor 142 is cleaned by the cleaning unit 147 to be prepared for the next image forming process.

In the cleaning unit 147, the predetermined D.C. current voltage is impressed on the metal roll 147b so that the toner can be easily collected which was scraped off by the cleaning blade 147a from the surface of the photoreceptor 142. The metal roll 147b is placed near the surface of the photoreceptor 142, wherein the metal roll 147b does not contact with the surface. While the surface of the photoreceptor is being cleaned, the cleaning blade 147a is pressed against the photoreceptor surface. After cleaning, the cleaning blade is removed from the surface. The auxiliary roller 147c is provided to the photoreceptor 142 in order to remove the unnecessary toner left on the photoreceptor surface when the cleaning blade 147a is removed. Since this auxiliary roller 147c is rotated in the opposite direction to the photoreceptor 142 and pressed against the photoreceptor, the unnecessary toner is completely removed from the photoreceptor surface.

In the example mentioned above, the color image processing apparatus of the present invention is applied to the color copier. Naturally, the color image processing apparatus of the present invention can be applied to other kinds of apparatus.

There are various kinds of methods to reduce the number of bit other than the method shown in this example and they can also be applied to the present invention. Accordingly, when these methods are applied to the invention, the number of bit can be reduced and as a result the capacity of the color reproduction table can be reduced without decreasing the volume of information.

As explained above, in the present invention, the digital color signals are divided into the even number channel and the odd number channel, and furthermore color reproduction is conducted while the number of bit is reduced. Consequently, the memory capacity can be reduced. Therefore, a color image processing apparatus can be realized which can properly reproduce colors by color reproduction tables with a small capacity of memory.

What is claimed is:

1. An image processing apparatus, comprising:
   input means for receiving image information including a plurality of pixel signals disposed in a predetermined bit configuration;
   separation means for separating the plurality of pixel signals into a plurality of channel signals;
   conversion means for converting each of the plurality of channel signals into a corresponding plurality of digital signals;
   digital signal alteration means for producing altered bit signals having a predetermined bit size;
   signal processing means for performing bit manipulations upon the altered bit signals to produce processed bit signals having a bit size smaller than the predetermined bit size of the altered bit signals;
   at least two parallel color reproduction means for producing respective processed pixel signals in accordance with the processed bit signals;
   composition means for combining the respective processed pixel signals to form color signals; and
   image composition means for producing a new pixel image in accordance with the color signals.

2. The image processing apparatus according to claim 1, wherein the digital signal alteration means produces altered bit signals including a least significant bit and a most significant bit with each remaining of the altered bits being juxtaposed between the least significant bit and the most significant bit.

3. The image processing apparatus according to claim 2, wherein the at least two color reproduction means include an even number channel color reproduction means and an odd number channel color reproduction means.

4. The image processing apparatus according to claim 3, wherein the signal processing means includes means for removing the least significant bit from the altered bit signals.

5. The image processing apparatus according to claim 3, wherein the signal processing means includes means for summing the least significant bit with another of the altered bit signals.

6. The image processing apparatus according to claim 4, wherein the altered bit signals which the least significant bit is removed are supplied to the odd number channel color reproduction means.

7. The image processing apparatus according to claim 5, wherein the altered bit signals which the least significant bit is summed with another of the altered bit signals are supplied to the even number channel color reproduction means.

8. The image processing apparatus of claim 1, wherein separation means comprise three separation elements, one separation element for separating pixel signals which are red in color, a second of separation elements for separating pixel signals which are green in color, and a third separation element for separating pixel signals which are blue in color.

9. The image processing apparatus according to claim 3, wherein composition means includes means for alternatively generating either processed pixel signals form even number channel color reproduction means or processed pixel signals form odd number channel color reproduction means.

10. The image processing apparatus according to claim 1, wherein processed pixel signals form color reproduction means correspond to color signals having at least one pigment.

11. The image processing apparatus according to claim 10, wherein processed pixel signals from color reproduction means correspond to color signals having 4 pigments; cyan, magenta, yellow, and black.

12. The image processing apparatus according to claim 11, wherein the image composition means includes means for PWM multi-value coding.

* * * * *

UNITED STATES PATENT AND TRADEMARK OFFICE
CERTIFICATE OF CORRECTION

PATENT NO. : 5,119,184
DATED      : June 02, 1992
INVENTOR(S) : SEIICHIRO HIRATSUKA ET AL.

It is certified that error appears in the above-identified patent and that said Letters Patent is hereby corrected as shown below:

Claim 9, column 10, line 34, change "form" to --from--.

Claim 9, column 10, line 36, change "form" to --from--.

Claim 10, column 10, line 39, change "form" to --from--.

Claim 11, column 10, line 45, change "pigments;" to --pigments:--.

Signed and Sealed this

Twelfth Day of October, 1993

Attest:

BRUCE LEHMAN

Attesting Officer   Commissioner of Patents and Trademarks